Jan. 2, 1940.   M. BESSONNEAU   2,185,581
DISAPPEARING HOOD FOR MOTOR VEHICLES
Filed Oct. 26, 1935   3 Sheets-Sheet 2
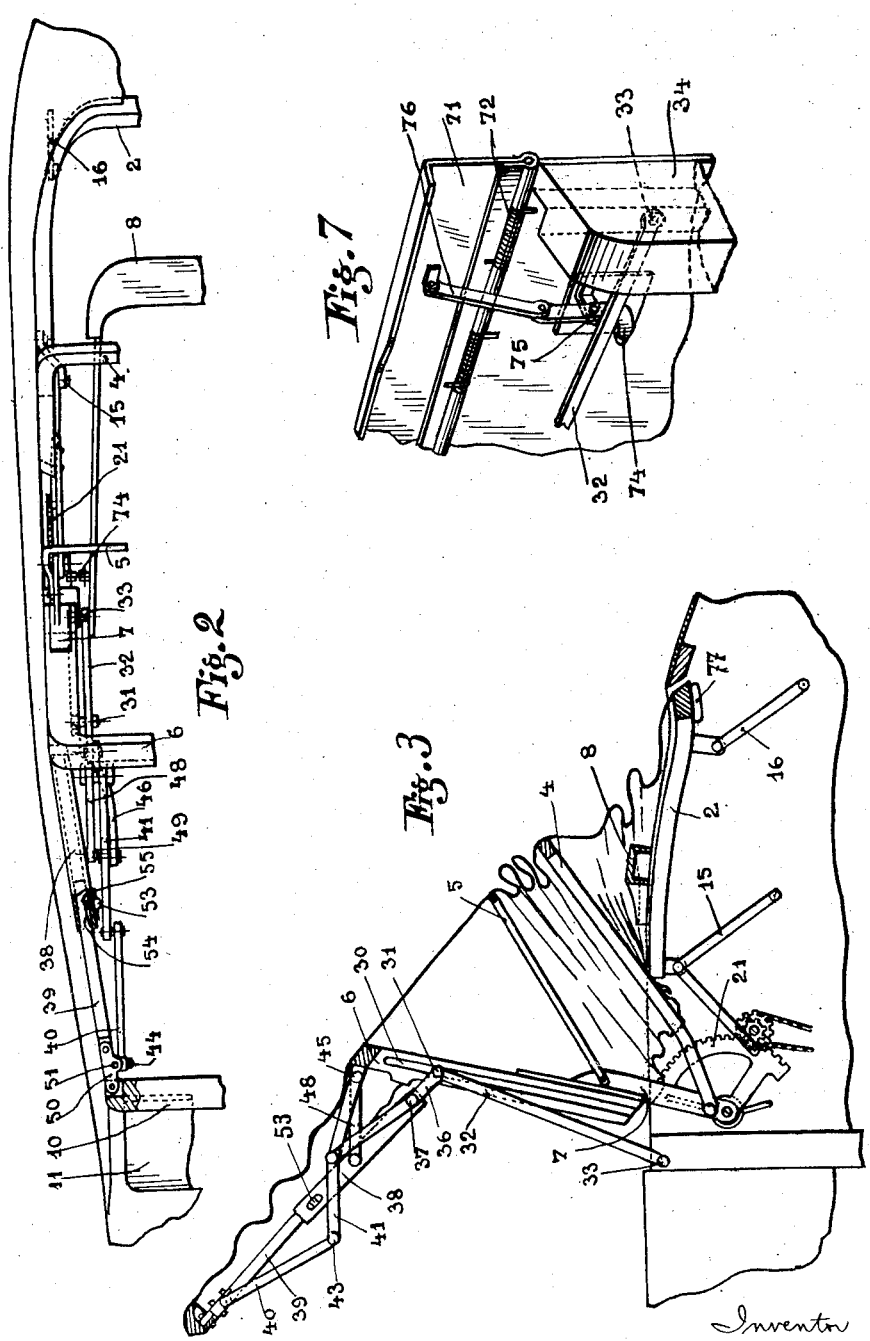

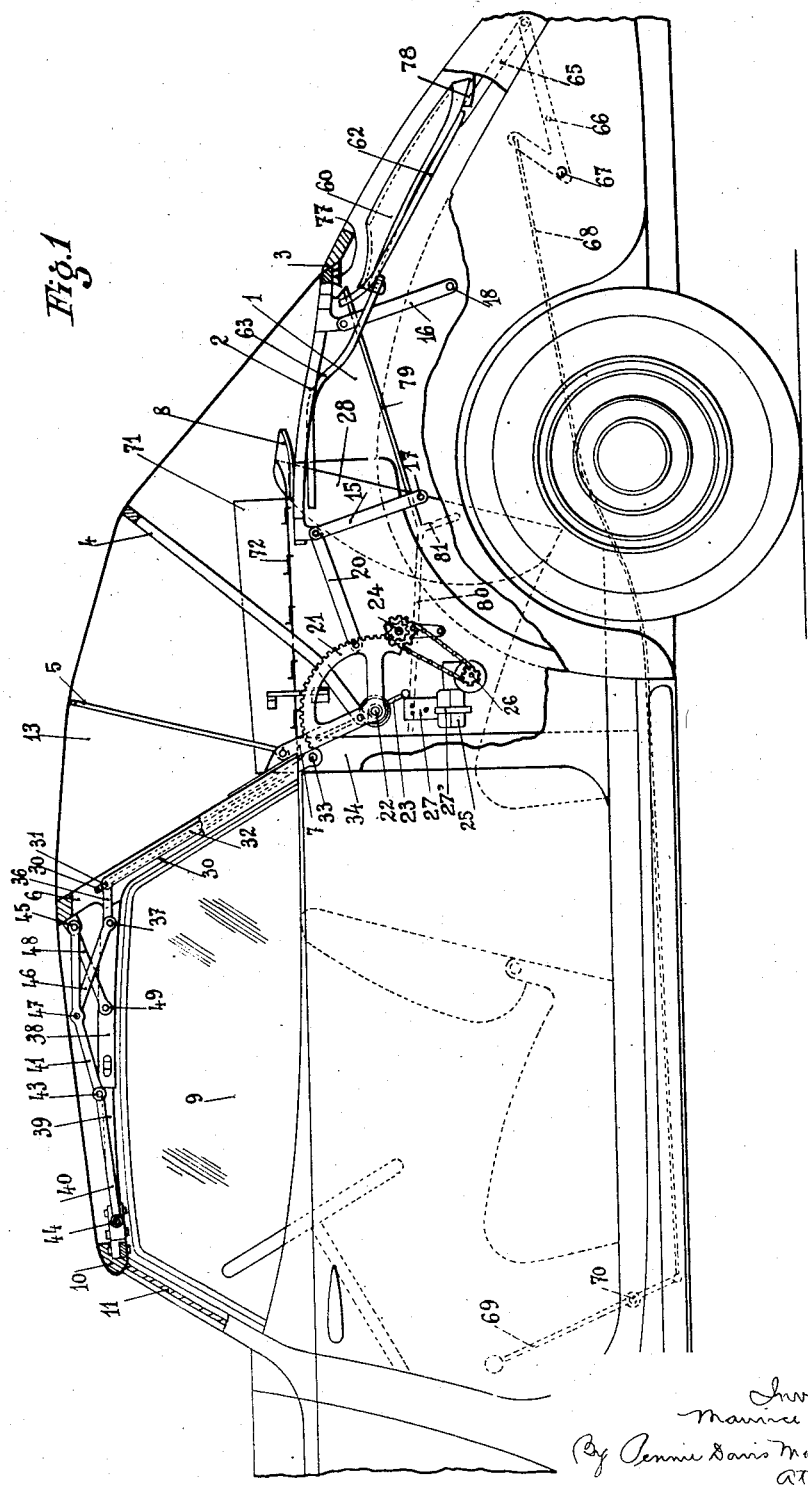

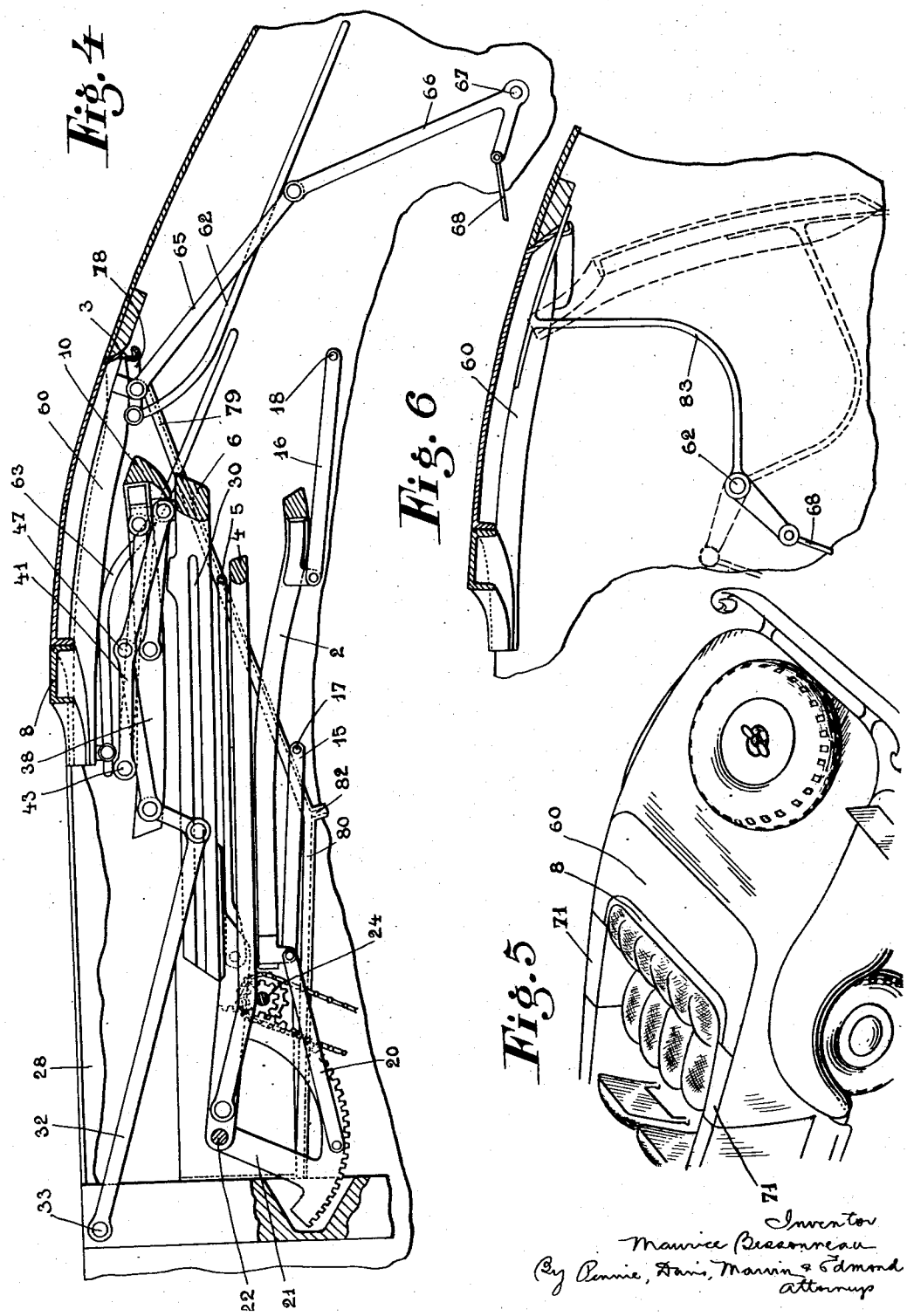

Patented Jan. 2, 1940

2,185,581

UNITED STATES PATENT OFFICE 2,185,581

DISAPPEARING HOOD FOR MOTOR VEHICLES

Maurice Bessonneau, Puteaux, France

Application October 26, 1935, Serial No. 46,845
In France October 27, 1934

10 Claims. (Cl. 296—136)

The present invention relates to a disappearing hood for motor vehicles adapted to travel on land or water, or in air, and it has for its object a hood combined with a carriage body in such a manner that it will entirely disappear within the said body, thus transforming an inside driving vehicle into a torpedo having a most approved form.

Another object of the invention consists in the combination of a preferably mechanically controlled hood with a carriage body provided with flaps or the like which completely and automatically cover the opening of the recess in the carriage body adapted to receive the hood when folded down.

Another object of the invention consists in a simple and practical arrangement permitting to effect all the controls required to transform a torpedo into an inside driving car, and inversely, from the driver's seat and without making it necessary to stop the vehicle.

In a preferred form of construction, the framework of hood comprises a tilt hoop to which is secured the rear end of a piece of waterproof canvas and which is located within said recess in the carriage body, said hoop being so arranged as to bear upon the edge of the said recess when in the operative position and to descend into the interior of said recess when the hood is folded down.

The opening of the recess in the carriage body in which the hood is stowed in the folded state is thus quite free and the said carriage body preferably comprises one or more panels, pivoting or slidable, which has been moved aside when the hood was opened out, and which now serve to close the said opening automatically or not—such opening being no longer apparent—without risk of damaging the canvas when the hood is folded down.

The above mentioned hoop is preferably arranged in such manner that it will move in the interior of the said recess while remaining parallel to itself, in order to facilitate the folding of the canvas.

The framework of the hood comprises, in addition to the said hoop which is preferably connected with a driving shaft, at least one support which is mounted on the same shaft and carries the front part of the framework, this being so arranged as to fold down when the said support turns about the said shaft and comes with the said hoop in the interior of the recess.

The front framework consists, to advantage, of at least one longitudinal telescoping bar which is pushed in concurrently with the pivoting of said support due to the sliding in a guide secured to the said support of a portion of a rod which is pivoted to the carriage work on a different axis from that of the said shaft.

The whole device is so arranged that it is adapted for use with all the known types of carriage body which become narrow towards the front of the vehicle, and it may be operated for instance by a single electric motor or by a motor mounted on each side of the vehicle.

Further objects, features and advantages will be set forth in the following description with reference to the annexed drawings which are given solely by way of example and in which:

Fig. 1 is an elevational view, with parts broken away, of a carriage body of a motor vehicle provided with a hood in conformity with the invention.

Fig. 2 is a corresponding plan view with the waterproof canvas removed.

Fig. 3 is a partial view analogous to Fig. 1 showing the hood in an intermediate position during the folding operation.

Fig. 4 is a partial view analogous to Fig. 1 showing the hood entirely folded.

Fig. 5 is a perspective view of a carriage body with the hood in the folded position.

Fig. 6 is a partial view analogous to Fig. 4 of a modification.

Fig. 7 is a detail view on a larger scale, the outside wall of the body being removed.

In the form of construction shown in Figs. 1 to 5, a recess 1 whose outlet orifice on the top part of the carriage body has a U shape is formed at the rear of the body of a motor vehicle, and the two branches of this U extending along the two lateral edges of the said body.

The framework of the hood comprises a first tilt hoop 2 which, in the operative position (Fig. 1), bears upon the rear edge 3 of the recess 1 with which it makes a joint, and also three other divergent hoops 4, 5 and 6, whereof the first two, 4 and 5, are pivoted to the lower end 7 of the last hoop 6.

This last hoop 6, whose front part forms the upright support for the lateral glass pane 9, carries the front framework which ends in a cross piece or tip 10 resting upon the top of the wind-shield 11. The covering consisting of a waterproof canvas 13 has its extreme ends secured respectively to the tilt hoop 2 and to the tip 10 and it may also be secured at an intermediate point to the hoop 6.

The following description relates to the mechanism which is situated on one side of the vehicle, it being understood that the mechanism situated on the other side is symmetrical.

The hoop 2 is mounted so that it will remain practically horizontal as it forms one side of a parallelogram whose other two sides consist of the links 15 and 16 which are pivotally mounted on horizontal axles 17 and 18, located practically in the same horizontal plane. The said hoop is connected by a link 20 to a sector 21 rotatable about an axle 22, and it participates in the rotation of said sector.

The sector 21 is subjected to the action of a spiral spring 23 which tends to turn it in the direction of the opening of the vehicle body top, and its outer perimeter is in gear engagement with a pinion 24 which is rotated by an electric motor 25 through the medium of reduction gear combined with a friction coupling 26 which limits the torque.

The whole of this mechanism is mounted on a metal plate 28 and may be assembled before the carriage body is constructed, and may be delivered separately, the motor 25 being secured to a member 27 supporting said plate by a collar 27'.

A slot 30 located practically according to a straight line passing through the axis of the axle 22 is provided in the hoop 6 and serves as a guide for an axle 31 to which is pivoted a link 32, this latter being pivoted to an axle 33 which is different from the shaft 22, and is mounted for instance on the upright 34 of the carriage body.

A small link 36, which participates in the rotation of the said link 32, is pivoted on an axle 37 mounted on a tubular member 38, in which a bar 39 is slidable. The telescoping movement of bar 39 is controlled by two links 40 and 41 which are pivoted together at 43; one link, 40, is pivoted on an axle 44 mounted on the end of the bar 39; the other link, 41, is pivoted on an axle 45 mounted on the hoop 6. A rod 46 is pivoted at an intermediate point 47 of the link 41 and upon the axle 37; a second rod 48 is pivoted at 45 and also at a point 49 of tubular member 38.

As shown in Fig. 2, the tip 10 is mounted on the bar 39 by means of a double-pivoted member 50, to which is pivoted the rod 40. This latter pivoting can be effected for instance by means of two brackets engaged one within the other and pivoted on a common vertical axle 51, one bracket being pivoted with a socket 44 on which is pivotally mounted the rod 40, held by a nut. On the other hand, a stop is provided on the tube 38 in order to limit the outward movement of the bar 39 without acting against the entering movement. The said stop may consist of a spring stud 53 which projects and enters a slot 54 formed in the bar 39. The bottom of said slot is inclined from the entrance towards the abutment 55, in such manner that the said stop will gradually move back during the entering movement of the bar 39 which encounters no obstacle, the outward movement being limited by the abutment 55.

It will be noted that it will suffice to turn the sector 21 from left to right in order to fold up the whole arrangement in a manner resembling what is shown in Fig. 3, and this folding commences by bringing down the rear hoop 4. The canvas is unfolded by the rotation of the sector 21 in the opposite direction, the tension of the canvas being maintained by means of the spring 23.

The inward and outward movement of the telescoping bar 39 is controlled by a link 40, by means of the sliding of the pivot axle 31 in the groove 30, effected by the movement of rotation of the hoop 6.

When opening out the hood device, the link 40 will continue to move forward after stopping of bar 39 by the abutment 55 and the member 50 will be pivoted outwardly, and hence the tip 10 will be brought forward into its definite position. In this manner, the hood will correspond exactly to the trapezoidal form of the vehicle, and the tip will offer no resistance to the inward and outward movements of the telescoping bar 39.

In order to obtain synchronism for the movements on the respective sides of the hood, the motors 25 (one being mounted on each side) are preferably motors of the series type; these are connected in series and are controlled by a reversing switch mounted on the front board. The proper adjustment of the devices 26 for limiting the torque will permit to obtain the movements of the hood without any risk of jamming.

The construction comprises, in order to close the box part 1 between edges 3 and 8 into which the hood is made to disappear, a movable flap or cover 60 corresponding to the form of the carriage body, as shown in Fig. 5. Its ends are movable upon rods which form guides, 62 and 63 (Fig. 1). The said flap is controlled by a link and a V-shaped lever 66, pivoted at 67 to the carriage body. One branch of said lever is connected by a rod 68 to a controlling lever 69 which is pivoted at 70 to the driver's place.

By means of this lever, the driver, before he operates the hood or after the disappearing of said hood, brings the cover 60 from the open position as represented into the closed position (Figs. 4 and 5) and inversely.

On the other hand, the construction comprises, in order to close the lateral openings through which the arrangement of links and uprights for the hoops is caused to disappear, suitable metallic flaps 71 pivoted on hinges provided with torsion springs tending to maintain the said flaps constantly in the raised position (Figs. 1 and 7).

When the hood is to be folded, the whole device is so arranged that the link 32 engages a hook 74 pivoted at 75 and connected by a rod 76 to the flap 71, so that the said flap will be brought down, thus taking the position shown in Fig. 5. It is thus given to the vehicle the perfect outline of a torpedo.

Inversely, when the hood is to be unfolded, the link 32 which is the first to be raised will release the hook 74 and the flap 71 will open by the action of the springs 73 before the rising framework can make contact with the said flap.

The whole device is completed by a spout or gutter 77 mounted on the edge and parallel to the axis of the wheels of the hoop 3; a spout 78 mounted on the edge of the flap 60; and two spouts 79 and 80 situated along each outer wall of the box part 1, which are adapted to collect the water from the aforesaid spouts and lead to an evacuation conduit 81.

Fig. 6 shows a modification of the flap device 60, and instead of being slidable, it is mounted on a support 82 pivoted on an axle 83. A rod 84 to which a cable 68 is attached is rotatable together with the support 82. It will be observed that the flap 60 will pivot automatically and will assume the position shown in the dotted lines, when the cable 68 is released, and that a tension exercised upon this cable will bring the flap into the closed position.

While I have described what I at present consider preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim is:

1. A device for covering a recess provided at the rear end of the body of a vehicle and adapted to contain a folded hood, said recess having a substantially U shaped opening, said device including a transverse panel, means for mounting said panel for movement to occupy a working position in which it covers the part of said opening corresponding substantially to the middle part of said U, and a rest position in which said part is discovered, at least two rigid flaps, means for mounting said flaps for pivotal movement substantially about edges of said opening corresponding to the respective branches of said U to occupy a position covering the parts of said recess corresponding substantially to the branches of said U and a second position in which said flaps are disposed substantially vertically, and operating means for said flaps.

2. A device as claimed in claim 1 in which said operating means are controlled by said hood.

3. A device as claimed in claim 1 wherein said hood includes at least one lever on each side pivoted within said recess, a projecting piece, connected to each of said flaps and adapted to come into contact with said lever at the end of the folding motion of the hood, thus closing said flap, resilient means designed to return said flap to its second position when said piece is released.

4. A device for covering a recess provided at the rear end of the body of a vehicle and adapted to contain a folded hood, including on each side a support pivoted to said body within said recess and a member pivoted within said recess at a point spaced from the pivot point of said support, said recess having a substantially U shaped opening, said device including a transverse panel supported within said recess, means for mounting said panel for movement to occupy a working position in which it substantially covers the part of said opening corresponding to the middle portion of said U and a rest position in which said part is discovered, at least one rigid side flap pivoted on each side of said body, a projecting piece connected to each flap and arranged to come into contact with said member adapted to close said flap, and resilient means designed to open said flap.

5. A device as claimed in claim 4 wherein said flaps are pivoted about the inner edge of said opening, whereby they are invisible from the outside of the body when they are in their second position, the hood being unfolded.

6. In a vehicle body the rear part of which is provided with a recess adapted to contain a folded hood, and having a U shaped opening, means for covering said opening including at least two rigid flaps, means mounting each of said flaps for pivotal movement about edges of said opening corresponding to the respective branches of said U to occupy a position covering a part of said recess and a second position in which said part is uncovered, the flaps being in said second position disposed substantially vertically, and operating means for said flaps controlled by said hood.

7. A vehicle body as claimed in claim 6 wherein each of said flaps is hinged to the inner side of said opening.

8. In a vehicle body the rear part of which is provided with a recess having a substantially U shaped opening in the top part of said body, said top part including a curved portion at the rear of said opening, said recess being adapted to contain a folded hood the rear end of the covering piece of which is placed within said recess substantially below said opening when the hood is folded whereby a space is provided within said recess between said curved portion and the folded hood, a transverse panel adapted to cover at least the portion of said opening corresponding to the middle part of said U, the outer surface of said panel being curved to merge in the closed position into the surface of said top portion, means for mounting said transverse panel for movement through said space to occupy a second position in which it is wholly disposed within said recess and below said curved portion.

9. A vehicle body as claimed in claim 8 including a fixed and horizontal pivot axis within said recess, at least one supporting member rigid with said transverse panel and mounted for rotation about said axis to occupy two positions corresponding respectively to the two positions of said panel, the surface of said supporting member directed in the forward direction being of concave form whereby said member is adapted to be displaced between its two positions without interfering with said folded hood.

10. A vehicle body as claimed in claim 8 including guiding means within said recess extending below said opening, below said curved portion and through said space, said panel being slidingly supported by said guiding means between its working and second position.

MAURICE BESSONNEAU.